(12) United States Patent
Lavezzi

(10) Patent No.: US 7,007,778 B2
(45) Date of Patent: Mar. 7, 2006

(54) CALIPER OF A DISC BRAKE

(75) Inventor: Roberto Lavezzi, Brembate Di Sopra (IT)

(73) Assignee: Freni Brembo S.p.A., Bergamo (IT)

( * ) Notice: Subject to any disclaimer, the term of this patent is extended or adjusted under 35 U.S.C. 154(b) by 58 days.

(21) Appl. No.: 10/487,875

(22) PCT Filed: Mar. 28, 2003

(86) PCT No.: PCT/IT03/00185

§ 371 (c)(1),
(2), (4) Date: Feb. 23, 2004

(87) PCT Pub. No.: WO2004/085869

PCT Pub. Date: Oct. 7, 2004

(65) Prior Publication Data
US 2004/0226784 A1 Nov. 18, 2004

(51) Int. Cl.
F16D 55/00 (2006.01)

(52) U.S. Cl. .................. 188/73.31; 188/73.1; 188/71.1
(58) Field of Classification Search ............. 188/73.34, 188/72.4, 72.5, 73.38, 71.1, 73.1, 73.31, 188/73.39, 73.46, 73.47
See application file for complete search history.

(56) References Cited

U.S. PATENT DOCUMENTS

| 3,997,032 | A | * | 12/1976 | Kondo | 188/72.4 |
| 4,573,554 | A | * | 3/1986 | Ritsema | 188/73.38 |
| 4,638,894 | A | | 1/1987 | Sitabkhan et al. | |
| 5,515,948 | A | * | 5/1996 | Gilliland | 188/72.5 |
| 5,964,321 | A | * | 10/1999 | Hinkens | 188/72.4 |
| 6,019,199 | A | * | 2/2000 | Heidenreich | 188/73.34 |

FOREIGN PATENT DOCUMENTS

| DE | 1223633 | 7/1964 |
| DE | 1223633 | 7/1966 |
| JP | 5498462 | 1/1978 |
| JP | 54101060 | 8/1979 |
| JP | 5498462 | 7/1984 |
| JP | 61031733 | 2/1986 |
| JP | 61247545 | 11/1986 |

* cited by examiner

Primary Examiner—Melanie Torres
(74) Attorney, Agent, or Firm—Sofer&Haroun, LLP

(57) ABSTRACT

A caliper of a disc brake comprises a caliper body having a first half-body and a second half-body. The first half-body has a first hole and the second half-body has a second hole, coaxial with the first hole.

The holes receive at least one connecting member suitable for firmly securing the first half-body to the second half-body and further provide an attachment seat capable of receiving an attachment member suitable for firmly securing said caliper body to the fork of a motorcycle.

22 Claims, 3 Drawing Sheets

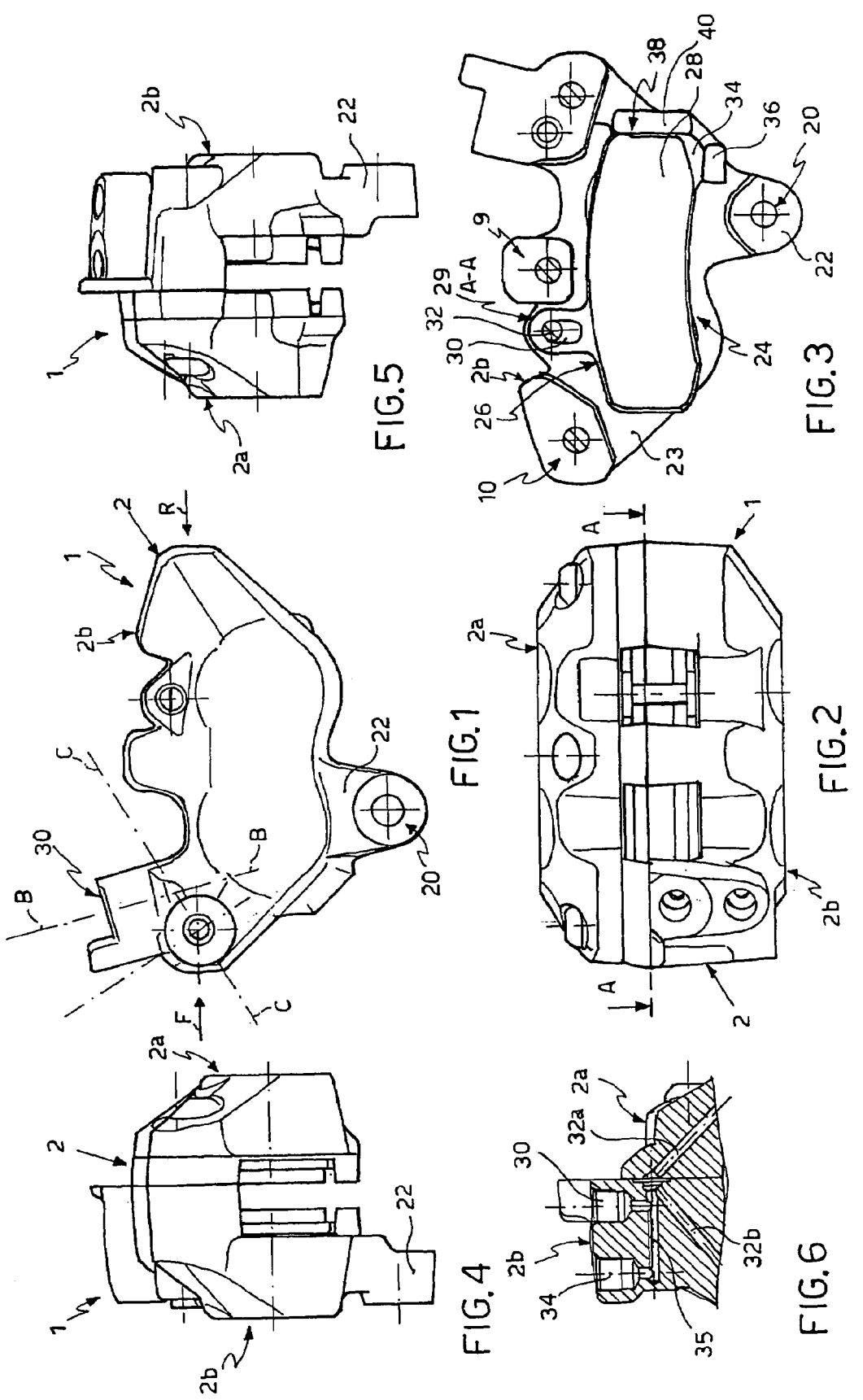

CALIPER OF A DISC BRAKE

RELATED APPLICATION

This application claims priority to, and is a U.S. National Stage Application of Patent Cooperation Treaty Application No. PCT/IT03/00185, filed on Mar. 28, 2003, the entirety of which is incorporated herein by reference.

FIELD OF THE INVENTION

The present invention relates to a caliper of a disc brake, particularly, but not solely, intended for use in the motorcycle sector.

BACKGROUND OF THE INVENTION

In the field of fixed type disc brake calipers, intended in particular for use in the motorcycle sector, the known embodiments provide a caliper body as two half-bodies separate from each other and connected by connecting screws which firmly secure the first half-body to the second half-body.

Furthermore, said caliper body is provided with attachment means which permit the connection of the caliper body to the support, and are disposed at lugs protruding from the caliper body itself.

However, the calipers produced according to the prior art are often too bulky and often unaesthetic, since they project too much from the support, especially in the case of calipers intended for motorcycle use.

A need was therefore felt to produce a caliper body that can be associated with a support, for example the fork of a motorcycle, and which is reduced in overall dimensions and reliable in use.

The problem underlying the present invention is that of devising a disc brake caliper which has structural and functional characteristics such as to fulfil the aforesaid requirements and at the same time to remedy the drawbacks mentioned with reference to the prior art.

SUMMARY OF THE INVENTION

This problem is solved by a caliper according to claim 1. The claims dependent thereupon describe alternative embodiments.

In the continuation of the description, reference will be made to the terms "circumferential", "radial" and "tangential", to be understood with reference to the directions of a disc that can be associated with the caliper according to the invention.

BRIEF DESCRIPTION OF THE DRAWINGS

The characteristics and advantages of the caliper according to the present invention will become clear from the following description of a preferred non-limiting exemplary embodiment, in which FIG. 1 shows a side view of a caliper body according to the invention;

FIG. 2 shows a radial view of the caliper body of FIG. 1;

FIG. 3 shows a partial section of the caliper body of FIG. 2, obtained along the section line A—A;

FIG. 4 shows a rear elevation of the caliper body of FIG. 1, obtained in the viewing direction R in FIG. 1;

FIG. 5 shows a front elevation of the caliper body of FIG. 1, obtained in the viewing direction R in FIG. 1;

FIG. 6 shows a partial section of the caliper body of FIG. 1, obtained along the line B—B of FIG. 1;

DETAILED DESCRIPTION OF THE INVENTION

Figure 7:
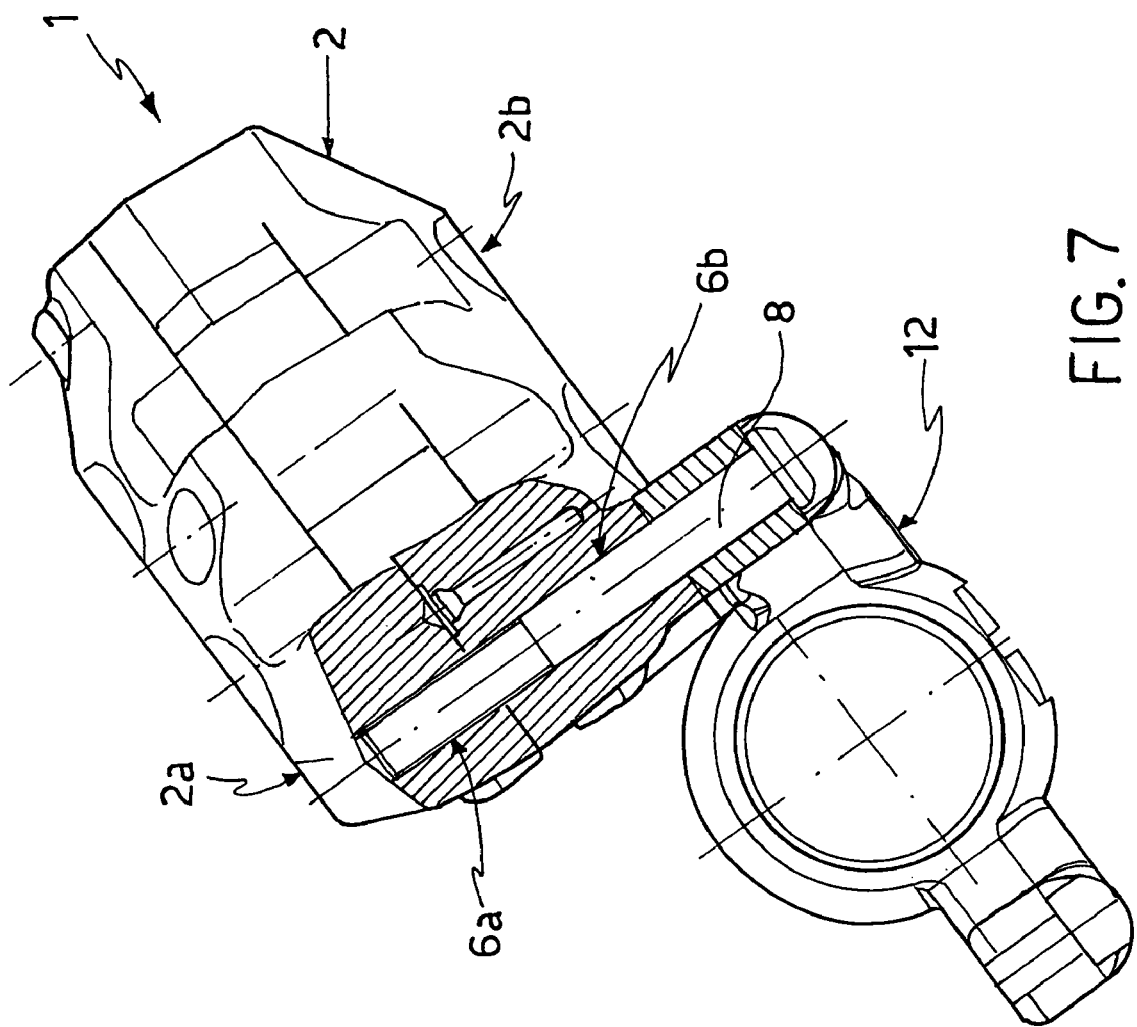
FIG. 7 shows a partial section of the caliper body of FIG. 1, obtained along the line C—C, according to a first alternative embodiment of the system of connection and attachment to the support.

With reference to the appended drawings, the reference 1 indicates generally a caliper comprising a caliper body 2.

Said caliper body 2 comprises a first half-body 2a and a second half-body 2b, separable from the first.

In other words, said first half-body 2a and said second half-body 2b are produced separately, for example by machining a starting semifinished part, obtained by casting, for example by means of machining carried out with machine tools.

Each half-body 2a, 2b comprises a central region which, with reference to the directions of the disc brake that can be associated with the caliper body 2, extends substantially tangentially.

In an assembly configuration of the disc brake, in which the caliper body 2 is arranged straddling the brake disc, said central regions of the caliper body 2 are disposed radially to the disc at the braking band of the brake disc.

The caliper body 2 comprises connection means suitable for firmly securing the first half-body 2a to the second half-body 2b.

Said connection means, in a preferred embodiment, provide hole/screw systems which make it possible to connect the first half-body 2a to the second half-body 2b.

In particular, the first half-body 2a has a first hole 6a and the second half-body 2b has a second hole 6b disposed, in a condition where the first half-body 2a is associated with the second half-body 2b, so as to be coaxial with the first hole 6a.

The first hole 6a and the second hole 6b are capable of receiving at least one connecting member suitable for firmly securing the first half-body 2a to the second half-body 2b.

In a preferred embodiment, said connecting member is a screw.

Moreover, in a preferred embodiment, said connection means comprise a plurality of hole/screw systems 9, 10 suitable for firmly securing the first half-body 2a to the second half-body 2b.

Said hole/screw systems are preferably disposed in a peripheral region adjacent and radially external to said central region, in a circumferential direction with respect to the brake disc that can be associated with the caliper body 2.

Moreover, the caliper body 2 has attachment means suitable for firmly securing said caliper body 2 to a fixed support 12, for example a fork of a motorcycle.

In particular, said attachment means comprise said first hole 6a of the first half-body 2a and said second hole 6b of the second half-body 2b. Said first and second hole are capable of receiving at least one attachment member suitable for firmly securing the second half-body 2b to the support 12.

In other words, said first hole 6a and said second hole 6b provide a single seat in common between said connection means and said attachment means.

In an alternative embodiment, a single connection and attachment member 8 firmly secures said first half-body 2a to said second half-body 2b and, at the same time, said second half-body 2b to said support 12 (FIG. 7).

In other words, in said alternative embodiment, the attachment member for attachment to the support 12 also constitutes the connecting member for firmly securing the half-bodies.

Figure 8:
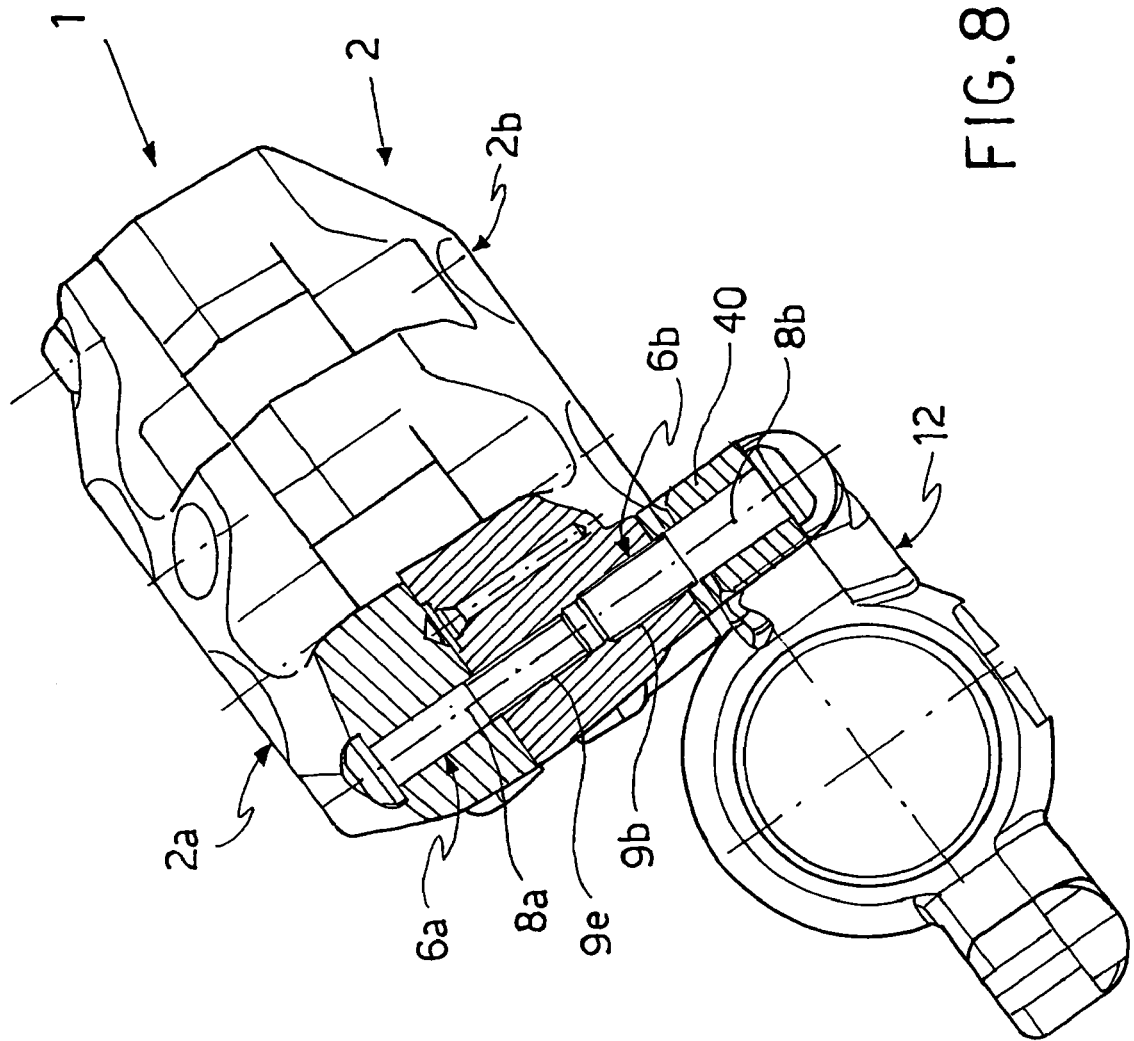
FIG. 8 shows a partial section of the caliper body of FIG. 1, obtained along the line C—C, according to a further alternative embodiment of the system of connection and attachment.

In a further alternative embodiment, said single seat is engageable with a first connecting member 8a which firmly secures the first half-body 2a and the second half-body 2b, and with a separate attachment member 8b which firmly secures the second half-body 2b to the fixed support 12 (FIG. 8).

In yet other words, said seat is engageable only partially by the first connecting member 8a, leaving a portion of the seat free and engageable by the attachment member 8b which firmly secures the second half-body 2b to the support 12.

In an alternative embodiment, said first hole 6a of the first half-body 2a has a diameter different from the diameter of the second hole 6b of the second half-body 2b. Preferably, said first hole 6a of the first half-body 2a has a diameter smaller than the diameter of the second hole 6b of the second half-body 2b.

In a further alternative embodiment, said second hole 6b of the second half-body 2b has a first portion 9a and a second portion 9b, said portions having a different diameter. In particular, said first portion 9a is close to the first hole 6a of the first half-body 2a and has a diameter smaller than the diameter of the second portion 9b.

Advantageously, said portions of different diameter make it possible to use connecting members between the first and the second half-body having a diameter smaller than the diameter of the attachment members for attaching the caliper body to the support 12.

Preferably, said attachment means further comprise a third hole 20, produced in a lug 22 protruding from the central region of the second half-body 2b, said lug preferably extending in a substantially radial direction.

In a preferred embodiment, the hole/screw systems 9, 10 of the connection means between the first half-body 2a and the second half-body 2b are disposed circumferentially with respect to the brake disc that can be associated with the caliper body, or are intersected by the same circumference concentric with the axis of the brake disc that can be associated with said caliper body (2).

In a further embodiment, the hole/screw systems 9, 10 of the connection means between the first half-body 2a and the second half-body 2b are disposed circumferentially with respect to the brake disc that can be associated with the caliper body, on a circumference external to the circumference on which lies the axis of said third hole 20 of the attachment means.

Each central region of the caliper body 2 provides a housing 23 for at least one respective pad 24.

In a preferred embodiment, each pad 24 consists of a plate 26 on which friction material 28 is supported.

The plate 26 is provided with a protuberance 29 in which there is provided an eye 30 suitable for engaging with a pin 32, preferably with clearance.

The plate 26 also provides a support area 34 which bears on a support member 36 of the caliper body 2.

Moreover, said plate 26 provides a reaction area 38, which engages with a reaction rib 40 of the caliper body 2.

Said eye/pin system and said support area/support member system provide bearing and suspension means for the caliper body 2 which are suitable for maintaining the pad in position and opposing the action of the braking forces during braking.

Moreover, the caliper 1 is provided with thrust means suitable for acting on the pads received in the respective half-bodies 2a, 2b for butting them against the braking band of the brake disc and producing braking.

Said thrust means comprise at least one piston slidingly received, sealed, in a respective seat, said seat being fluidly connected to a hydraulic circuit containing brake fluid, said hydraulic circuit being at least partially received in said caliper body 2.

In particular, said hydraulic circuit comprises a fluid inlet 30 at which means are provided for the hydraulic connection between a tube coming from a pump, that can be actuated for example, manually, by means of a lever, and said caliper body.

Preferably, said fluid inlet 30 is provided at the second half-body 2b.

Said hydraulic circuit provides a first section 32a, provided in said first half-body 2a and fluidly connected to at least one seat for a piston of the first half-body 2a.

Said fluid inlet 30 is further fluidly connected to a second section 32b of the hydraulic circuit, provided in said second half-body 2b of the caliper body 2, and connected to at least one seat for a piston of the second half-body 2b.

Said first section 32a and said second section 32b of the hydraulic circuit are fluidly connected through a connecting aperture 33.

The connection between said first half-body 2a and said second half-body 2b is suitable for producing the hydraulic connection between said first section 32a and said second section 32b of the hydraulic circuit.

In particular, in the embodiment which provides the first connecting member 8a suitable for firmly securing the first half-body 2a and the second half-body 2b, and the separate attachment member 8b which firmly secures the second half-body 2b to the support 12, said first connecting member 8a is suitable for producing a sealed hydraulic connection between the first section 32a and the second section 32b of the hydraulic circuit.

In other words, in said embodiment, though the seat is not engaged with the attachment member 8b, or the mounting on the support 12 not carried out, said first half-body 2a and said second half-body 2b are nevertheless firmly secured to each other, in order to ensure the seal between said sections of the hydraulic circuit.

Moreover, in an alternative embodiment, said hydraulic circuit comprises a bleeder seat 34 capable of receiving a bleeder plug. Said bleeder seat 34 is fluidly connected to said fluid inlet 30 by a bleeder section 35.

In an assembly configuration of the disc brake, each pad is received in the respective housing of the caliper body 2, suspended by means of the eye 30 on the pin 32 and bearing on the support member 36 with the support area 34.

The first half-body 2a is connected to the second half-body 2b by way of said connection means, in particular by way of the hole/screw systems 9, 10.

The connecting member 8a is engaged in the seat provided by the first hole 6a and the second hole 6b and ensures a sealed connection between the first section 32a and the second section 32b of the hydraulic circuit.

The attachment member 8b firmly secures the second half-body 2b to the fixed support 12, for example to the front fork of a motorcycle, in order to transmit the braking action, during braking, from the pads to said fixed support 12 (FIG. 8).

In one embodiment, the single connection and attachment member 8 engages the seat produced by the first hole 6a and the second hole 6b, connecting the first half-body 2a to the second half-body 2b and, at the same time, the caliper body 2 to the support 12 (FIG. 7).

In addition, a further screw, engaged with the third hole 20, completes the attachment of the caliper body 2 to the fixed support 12.

The fluid inlet 30 is connected to the tube coming from the pump.

In normal operation of the disc brake, the action of the driver of the vehicle, for example a motorcycle, pressurizes the brake fluid, for example by actuation of the lever of the pump.

The brake fluid under pressure acts on the pistons which, sliding in the respective seats, act on the pads, causing them to butt against the braking band of the brake disc, producing braking.

The braking action is transmitted from the pad to the reaction rib, against which the reaction portion of the pad abuts, and from said rib to the caliper body, discharging to the support 12.

Said attachment means ensure the connection between the caliper body and said fixed support 12.

Unusually, the caliper according to the invention is compact and reduced in dimensions, and particularly, but not solely, suitable for use in the motorcycle field.

Advantageously, in addition, the connection means and the attachment means are at least partially integrated, sharing a seat provided by a plurality of holes, limiting the overall dimensions of the caliper body.

According to a further advantageous feature, the caliper according to the invention provides at least one connecting member which simultaneously connects the half-bodies of the caliper body and attaches the caliper body to the fixed support.

Advantageously, in addition, the seat provided by the union of the holes of a half-body, shared by the connection means and by the attachment means, is partially engageable by a first connecting member which firmly secures the half-bodies, and by a separate attachment member which firmly-secures the caliper body to the support.

According to this advantageous feature, the half-bodies of the caliper body are connected at the time of production by specialized technicians, who tighten the connecting screws to design values capable of ensuring correct behaviour of the caliper body with respect to stresses.

Moreover, advantageously, the separate connecting member makes it possible to hold the half-bodies of the caliper body together even when mounting on the fixed support has not been carried out.

Moreover, the separate connecting member makes it possible to carry out the screwing operation in the workshop, according to screwing modes and conditions which ensure the hydraulic seal between the sections of the hydraulic circuit disposed in the respective half-bodies.

It is clear that an expert in the field may apply numerous variations to the caliper provided with the connection and attachment system described above, all however to be understood as included within the scope of teaching as defined by the following claims.

What is claimed is:

1. A caliper of a disc brake that can be associated with a fixed support for the transfer of the braking action from a disc to said fixed support, said caliper comprising:
   a caliper body having a first half-body and a second half-body, separable from the first,
   wherein said first half-body has a first hole and said second half-body has a second hole, which in conditions where the first half-body is associated with the second half-body is coaxial with the first hole, said holes being capable of receiving at least one connecting member suitable for firmly securing said first half-body to said second half-body; and
   wherein said first hole and said second hole further provide an attachment seat capable of receiving an attachment member suitable for firmly securing said caliper body to said support, wherein said attachment member is a member separate from said connecting member for connecting the half-bodies of the caliper body.

2. A caliper according to claim 1, wherein said seat provided by said first and second hole, and engaged by said connecting member has a free portion not engaged by said connecting member.

3. A caliper according to claim 2, wherein said free portion of the seat provided by said first hole and said second hole is capable of receiving the attachment member for attachment between the caliper body and the support.

4. A caliper according to claim 1, wherein said second hole has a first portion and a second portion, said first portion having a diameter smaller than the diameter of said second portion.

5. A caliper according to claim 4, wherein said connecting member has a nominal diameter smaller than the nominal diameter of the attachment member.

6. A caliper according to claim 1, wherein said connection means are suitable for ensuring the fluid connection between a first section and a second section of a hydraulic circuit of said caliper body, said first section being provided in the first half-body and said second section being provided in said second half-body.

7. A caliper according to claim 6, wherein said fluid connection is ensured independently of the mounting of the caliper body on the support.

8. A caliper according to claim 1, wherein said attachment member for attaching the caliper body to the support also constitutes the connecting member for connection between the first half-body and the second half-body.

9. A caliper according to claim 8, wherein said attachment and connection member comprises a screw suitable for simultaneously engaging the first half-body, the second half-body and the fixed support.

10. A caliper according to claim 1, wherein said connection means provide a plurality of hole/screw systems for firmly securing said first half-body to said second half-body.

11. A caliper according to claim 10, wherein said hole/screw systems are intersected by the same circumference concentric with the axis of the brake disc that can be associated with said caliper body.

12. A caliper according to claim 1, wherein said attachment means comprise a third hole provided in a lug protruding from a central region of the second half-body.

13. A caliper according to claim 12, wherein hole/screw systems of the connection means are disposed on a circum ference external with respect to the circumference on which lies the axis of said third hole of the attachment means.

14. A caliper according to claim 1, wherein said seat provided by said first and second hole, and engaged by said connecting member has a free portion not engaged by said connecting member.

15. A caliper according to claim 14, wherein said free portion of the seat provided by said first hole and said second hole is capable of receiving the attachment member for attachment between the caliper body and the support.

16. A caliper according to claim 1, wherein said connection means are suitable for ensuring the fluid connection between a first section and a second section of a hydraulic circuit of said caliper body, said first section being provided in the first half-body and said second section being provided in said second half-body.

17. A caliper according to claim 16, wherein said fluid connection is ensured independently of the mounting of the caliper body on the support.

18. A caliper according to claim 1, wherein said connection means provide a plurality of hole/screw systems for firmly securing said first half-body to said second half-body.

19. A caliper according to claim 18, wherein said hole/screw systems are intersected by the same circumference concentric with the axis of the brake disc that can be associated with said caliper body.

20. A caliper according to claim 1, wherein said attachment means comprise a third hole provided in a lug protruding from a central region of the second half-body.

21. A caliper according to claim 20, wherein hole/screw systems of the connection means are disposed on a circumference external with respect to the circumference on which lies the axis of said third hole of the attachment means.

22. A disc brake comprising at least one caliper according to claim 1.

* * * * *